M. ROBBINS.
CORN PLANTER.
No. 525. Reissued Feb. 9, 1858.
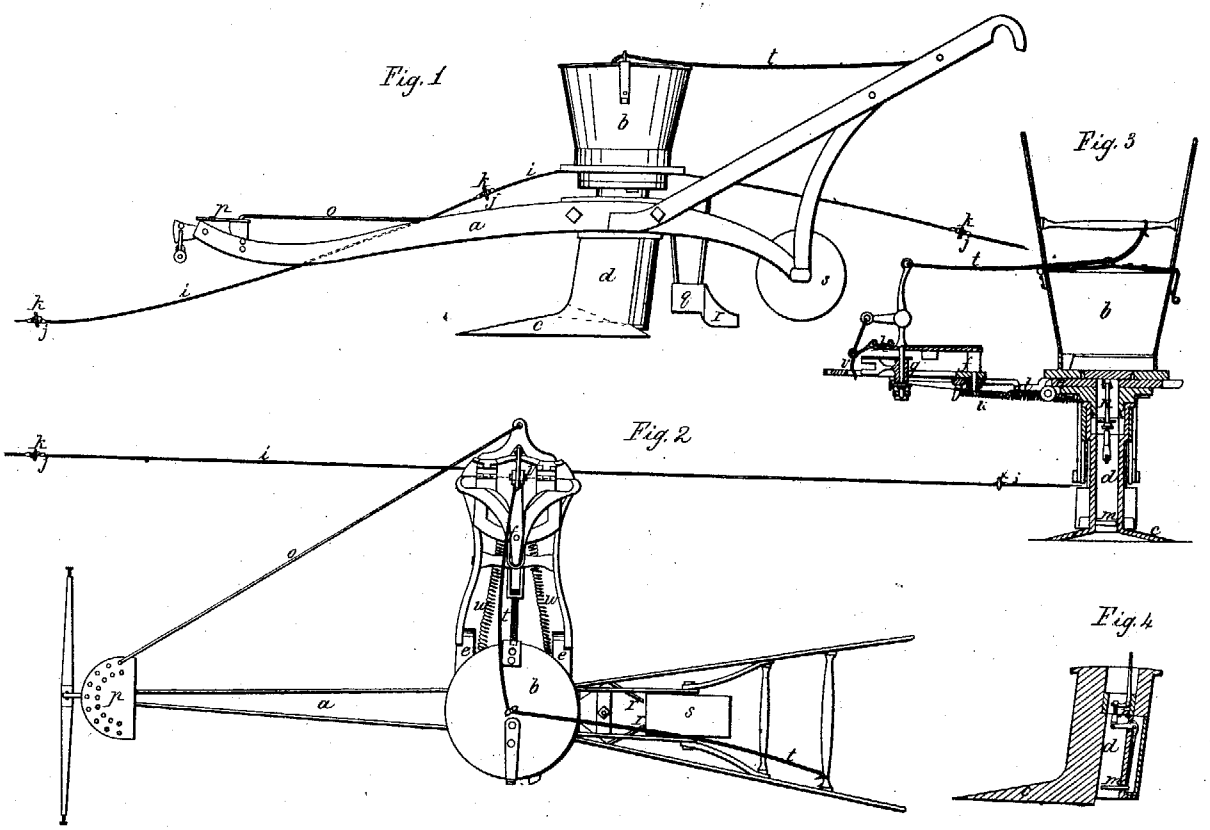
THE NORRIS PETERS CO., PHOTO-LITHO., WASHINGTON, D. C.

UNITED STATES PATENT OFFICE.

MARTIN ROBBINS, OF CINCINNATI, OHIO.

IMPROVEMENT IN CORN-PLANTER.

Specification forming part of Letters Patent No. 16,611, dated February 10, 1857; Reissue No. 525, dated February 9, 1858

*To all whom it may concern:*

Be it known that I, MARTIN ROBBINS, of Cincinnati, Hamilton county, Ohio, have invented a new and useful Improvement in Corn-Planters; and I hereby declare the following to be a full and exact description thereof, reference being had to the accompanying drawings, making part of this specification.

The object of my invention is to enable a seed-planting plow, without any previous "laying off" of the ground, to plant in equidistant and opposite hills or "check-rows," so as to admit of cross plowing and cultivation.

Machines heretofore contrived for dropping seed in "hills" with sufficient regularity to admit of cross-cultivation have failed to perform their object, because a driving-wheel working upon loose and shifting soil has been relied on as the source of motion to the seed-delivering apparatus. Such a wheel is unavoidably irregular in its action, and hence the crooked cross-rows which are the invariable result of this mode of planting, and have caused most farmers still to prefer the old laborious practice of marking off followed by hand-planting.

In the accompanying drawings, Figure 1 is a side view of a corn-planting plow with my improvements. Fig. 2 is a top view of the same. Fig. 3 is a transverse section through the hopper. Fig. 4 is a longitudinal section of the tubular standard and share.

*a* is a beam of usual construction.

*b* is a hopper attached to the beam *a*.

*c* is the share, the standard *d* of which is constructed in tubular form and attached to the under side of the beam *a* beneath the hopper. At the bottom of the hopper and within the hollow standard is a suit of seed measuring and delivering mechanism, which, not differing materially from others now in use, requires no specific description.

*e e* are a pair of lugs adapted for the hinged attachment of a frame, *f*, which has a lateral extension somewhat greater than that of the single-tree. This frame is called by me the "arm." To the outer end of the arm *f* is fastened a box, *h*, open "fore and aft" to permit the passage of a chain, hereinafter described. In the box *h* is a tappet, *g*, which receives from the chain an intermittent vibratory motion, which is transmitted to the seed-delivering mechanism by means of a rod, *l*. The tappet *g* is restored to its normal or resting position after each deflection by means of springs *w*.

The device chiefly instrumental in effecting the regular automatic planting in check-rows consists as follows: *i j k* is a chain composed of rods *i*, united end to end by equidistant hook-and-eye joints, *j*, each joint being provided with a button, *k*, which is the immediate means of vibrating the tappet *g*. These buttons are of course placed at a distance apart corresponding with that desired between the consecutive hills.

*t* is a cord, which, extending from the hinged or shifting cap *v* of the chain-box to the hand of the operator, enables the liberation of the chain when desired.

*o* is a brace which extends from the outer end of the arm to the fore end of the beam, serving to hold the former in any required position. The adjustable element is provided in the form of a perforated plate, *p*, attached to the beam.

To insure complete regularity the final dropping of each charge of grain is made to take place as near as [illegible]ble to the ground by means of a valve, *m*, located near the bottom of the hollow standard, and connected with the seed-measuring mechanism by means of a swivel-jointed rod, *n*—an arrangement which admits of the free exercise of the valve functions in every position of the arm *f*. *q r* is a device for covering the corn to a uniform depth. *s* is a roller to press the earth compactly about the seed; but one arm, *f*, is here shown. Another of similar construction may be attached in like manner to the opposite side of the machine for use while the machine is going in the opposite direction; or a single arm may suffice by being made reversible from side to side. The latter arrangement is thought to be preferable as making the machine more compact and diminishing the danger of striking obstacles.

The operation is as follows: A suitable base-line being marked off (by plow or otherwise) along one side of the field, one end of the chain is anchored or made fast at the commencement of the said line, and the chain is extended rectangularly therefrom to the other side of the field, where a site is erected at a distance on the field side of the chain equal to the length of the arm *f* from the center of the machine. The operator then, returning to the base-line, places the machine in position, and, having put the chain in the box *h*, starts the machine forward. The passage of the box *h* along the chain causes the buttons *k* to actuate the tappet *g*, and through it the seeding mechanism, so as to plant at regular intervals along the ground. When the machine has reached the termination of a row the chain is removed from the box *h*, and the machine is placed at the commencement of the next row facing in the opposite direction. The arm *f* is then swung round until it projects from the opposite side of the beam, and the chain being anchored in proper position and returned to the box, the work proceeds as before. Having proceeded a short distance, the operator may halt an instant and shift the (then) back end of the chain to the position required for the next row, a slight deflection of the chain not sensibly affecting the regular spacing of the hills, and the direction and straightness of the rows being governed by the eye and hand of the operator, as in the customary way.

By the above-described use of a single reversible arm the chain will lie always to the planted side of the machine, being for the greater part of its length shifted laterally by the action of the machine as it moves forward.

The hooks and eyes enable the chain to be lengthened or shortened to suit any field, and facilitate its extrication in case of its becoming entangled. Common snap-links may be substituted for the said hook-and-eye joints, if preferred.

The particular method above described of constructing the chain is selected, because it has been approved in actual use, and because it illustrates all the material features of that part of the invention; but it is evidently susceptible of various modifications without varying its leading characteristics. For example for the better class of machines a fine galvanized wire cord may take the place of the jointed rod or chain, which cord may be wound on a reel attached to the machine, and one end being anchored it may be laid down or stretched by the machine itself in the act of planting the first row of hills.

I claim as new and of my invention herein—

1. The method set forth of discharging seed from a plow or drill by means of the anchored chain *i j k* or its equivalent.

2. The chain or cord *i j k*, adapted, substantially as set forth, to operate the discharging mechanism of a seed-planter.

3. In the described combination with a suitable chain or cord, the arm *f*, provided with a vibrating claw or tappet, *g*, or substantially equivalent devices operating the seed-delivering mechanism, as set forth.

In testimony of which invention I hereunto set my hand.

MARTIN ROBBINS.

Attest:
GEO. H. KNIGHT,
WILLIAM BRISECKEY.